US012784463B2

(12) United States Patent
Rosca et al.

(10) Patent No.: US 12,784,463 B2
(45) Date of Patent: Nov. 3, 2026

(54) SYSTEM AND METHOD FOR CONTROLLING AUTONOMOUS MACHINERY BY PROCESSING RICH CONTEXT SENSOR INPUTS

(71) Applicant: Siemens Corporation, Washington, DC (US)

(72) Inventors: Justinian Rosca, Princeton, NJ (US); Tao Cui, Princeton Junction, NJ (US); Naveen Kumar Singa, Plainsboro, NJ (US)

(73) Assignee: Siemens Corporation, Washington, DC (US)

( * ) Notice: Subject to any disclaimer, the term of this patent is extended or adjusted under 35 U.S.C. 154(b) by 96 days.

(21) Appl. No.: 18/836,967

(22) PCT Filed: Mar. 30, 2022

(86) PCT No.: PCT/US2022/022552
§ 371 (c)(1), (2) Date: Aug. 8, 2024

(87) PCT Pub. No.: WO2023/191780
PCT Pub. Date: Oct. 5, 2023

(65) Prior Publication Data
US 2025/0148802 A1 May 8, 2025

(51) Int. Cl.
*G06V 20/58* (2022.01)
*G05D 1/617* (2024.01)
(Continued)

(52) U.S. Cl.
CPC ............. *G06V 20/58* (2022.01); *G05D 1/617* (2024.01); *G06V 10/764* (2022.01);
(Continued)

(58) Field of Classification Search
None
See application file for complete search history.

(56) References Cited

U.S. PATENT DOCUMENTS 12,183,050 B1 * 12/2024 Khinvasara ............ G06V 20/58
2019/0228232 A1 * 7/2019 Lécart .................. G08G 1/0175
(Continued)

OTHER PUBLICATIONS

Murphy et al, "When to explicitly Replan paths for mobile robots", Apr. 1997, IEEE, (Year: 1997).*
(Continued)

*Primary Examiner* — Kenneth M Dunne

(57) ABSTRACT

A computer-implemented method for controlling an autonomous machine includes processing sensor data streamed via a plurality of calibrated sensors by a plurality of perception modules to extract perception information from the sensor data in real time. The extracted real time perception information from the plurality of perception modules is fused by a context awareness module to create a blackboard image, which is a representation of an operating environment of the autonomous machine derived from fusion of the extracted perception information using a controlled semantic, defining a context of the autonomous machine. A stream of blackboard images, representing a time evolving context of the autonomous machine, is processed by an action evaluation module, using a control policy, to output a control action to be executed by the autonomous machine. The control policy includes a learned mapping of context to control action represented by blackboard images created using the controlled semantic.

17 Claims, 7 Drawing Sheets

(51) Int. Cl.

| | |
|---|---|
| ***G05D 111/10*** | (2024.01) |
| ***G06V 10/70*** | (2022.01) |
| ***G06V 10/764*** | (2022.01) |
| ***G06V 10/80*** | (2022.01) |
| ***G06V 10/82*** | (2022.01) |
| ***G06V 20/70*** | (2022.01) |

(52) U.S. Cl.
CPC .......... *G06V 10/768* (2022.01); *G06V 10/809* (2022.01); *G06V 20/70* (2022.01); *G05D 2111/10* (2024.01); *G06V 10/82* (2022.01)

(56) References Cited

U.S. PATENT DOCUMENTS

| | | | | |
|---|---|---|---|---|
| 2019/0347806 | A1* | 11/2019 | Vajapey | G06T 7/20 |
| 2020/0082227 | A1* | 3/2020 | Wierstra | G06F 18/2185 |
| 2020/0110416 | A1* | 4/2020 | Hong | G06N 20/00 |
| 2021/0004611 | A1* | 1/2021 | Garimella | G08G 1/166 |
| 2021/0094539 | A1* | 4/2021 | Beller | G08G 1/167 |
| 2021/0406560 | A1* | 12/2021 | Park | G06N 3/084 |
| 2022/0060818 | A1* | 2/2022 | Hafizovic | H04R 3/005 |
| 2022/0375189 | A1* | 11/2022 | Beye | G06V 20/00 |

OTHER PUBLICATIONS

Thorpe et al, "An Architecture for Autonomous Vehicle Navigation", 1985, AIAA (Year: 1985).*
Utsunomiya Hiroki et al: "Contextual Behaviors and Internal Representations Acquired by Reinforcement Learning with a Recurrent Neural Network in a Continuous State and Action Space Task"; Nov. 25, 2008 (Nov. 25, 2008), SAT 201518th International Conference, Austin, TX, USA, Sep. 24-27, 2015; [Lecture Notes in Computer Science; Lect.Notes Computer], Springer, Berlin, Heidelberg, pp. 970-978, XP047383342.
"Deep reinforcement learning"; Wikipedia, Mar. 23, 2022 (Mar. 23, 2022), pp. 1-4,XP055983099, Retrieved from the Internet: URL:https://en.wikipedia.org/w/index.php?title=Deep_reinforcement_learning&oldid=I07 8792888 [retrieved on Nov. 18, 2022]p. 1, line 32—line 40 reference 10.

* cited by examiner

SYSTEM AND METHOD FOR CONTROLLING AUTONOMOUS MACHINERY BY PROCESSING RICH CONTEXT SENSOR INPUTS

STATEMENT REGARDING FEDERALLY SPONSORED DEVELOPMENT

Development for this invention was supported in part by Subaward Agreement No: ARM-TEC-19-02-F-05, awarded by the Advanced Robotics for Manufacturing Institute (ARM) that operates under Technology Investment Agreement Number W911NF-17-3-0004 from the U.S. Army Contracting Command. Accordingly, the United States Government may have certain rights in this invention.

TECHNICAL FIELD

The present disclosure relates generally to the control of autonomous machinery. In particular, one or more disclosed embodiments relate to a system and method for controlling autonomous machinery by processing rich context sensor inputs.

BACKGROUND

In comparison to traditional automation, autonomy can give each asset on a factory floor the decision-making and self-controlling abilities to act independently and adaptively in a dynamic environment. In autonomous machinery, such as automated guided vehicles (AGV) and robotic applications, it is a basic task for a control system to take in the sensor input data, combine the inputs appropriately depending on the context, and control the machinery with an algorithm for generating setpoints and commands. Traditionally, the sensor inputs are digital or analog inputs, such as images, cloud point data (e.g., lidar, laser, etc.), voltage or currents, digital on/off, etc. A simple control law that takes in such digital and analog inputs and generates control setpoints would be sufficient for most applications.

For example, traditional AGVs usually follow a magnetic or painted track on the floor. The inputs to the control system typically comprise, for example, odometry and deviation from the track. The control system typically uses a proportional-integral-derivative (PID) control loop to take in these analog/digital inputs and generate drive commands.

However, as the capability of sensors and the computing power of control systems have become more and more advanced, in present and future generation control systems, more rich (and higher bandwidth) context sensor inputs (e.g., real time audio/video) are being used as inputs. From these rich context sensor inputs, a more powerful control system, which is capable of analyzing rich context sensor data and generating control commands based on these sensor inputs in real time, will be a key technology to many applications.

SUMMARY

Briefly, aspects of the present disclosure provide a technique for controlling autonomous machinery by processing rich context sensor inputs to extract perceptions that define a context and generating control actions based on a learned mapping of context to control action.

A first aspect of the disclosure provides a computer-implemented method for controlling an autonomous machine. The method comprises acquiring sensor data streamed via a plurality of sensors calibrated with respect to a common real world reference frame centered on the autonomous machine. The method comprises processing the streamed sensor data by a plurality of perception modules to extract perception information from the sensor data in real time. The method comprises fusing the extracted real time perception information from the plurality of perception modules by a context awareness module to create a blackboard image. The blackboard image is a representation of an operating environment of the autonomous machine derived from fusion of the extracted perception information using a controlled semantic, which defines a context of the autonomous machine. The streamed sensor data is thereby transformed into a stream of blackboard images defining an evolution of context of the autonomous machine with time. The method comprises processing the stream of blackboard images by an action evaluation module using a control policy to output a control action to be executed by the autonomous machine. The control policy comprises a learned mapping of context to control action using training data in which contexts are represented by blackboard images created using the controlled semantic.

Other aspects of the present disclosure implement features of the above-described method in computerized control systems and computer program products.

Additional technical features and benefits may be realized through the techniques of the present disclosure. Embodiments and aspects of the disclosure are described in detail herein and are considered a part of the claimed subject matter. For a better understanding, refer to the detailed description and to the drawings.

BRIEF DESCRIPTION OF THE DRAWINGS

The foregoing and other aspects of the present disclosure are best understood from the following detailed description when read in connection with the accompanying drawings. To easily identify the discussion of any element or act, the most significant digit or digits in a reference number refer to the figure number in which the element or act is first introduced.

DETAILED DESCRIPTION

Figure 1:
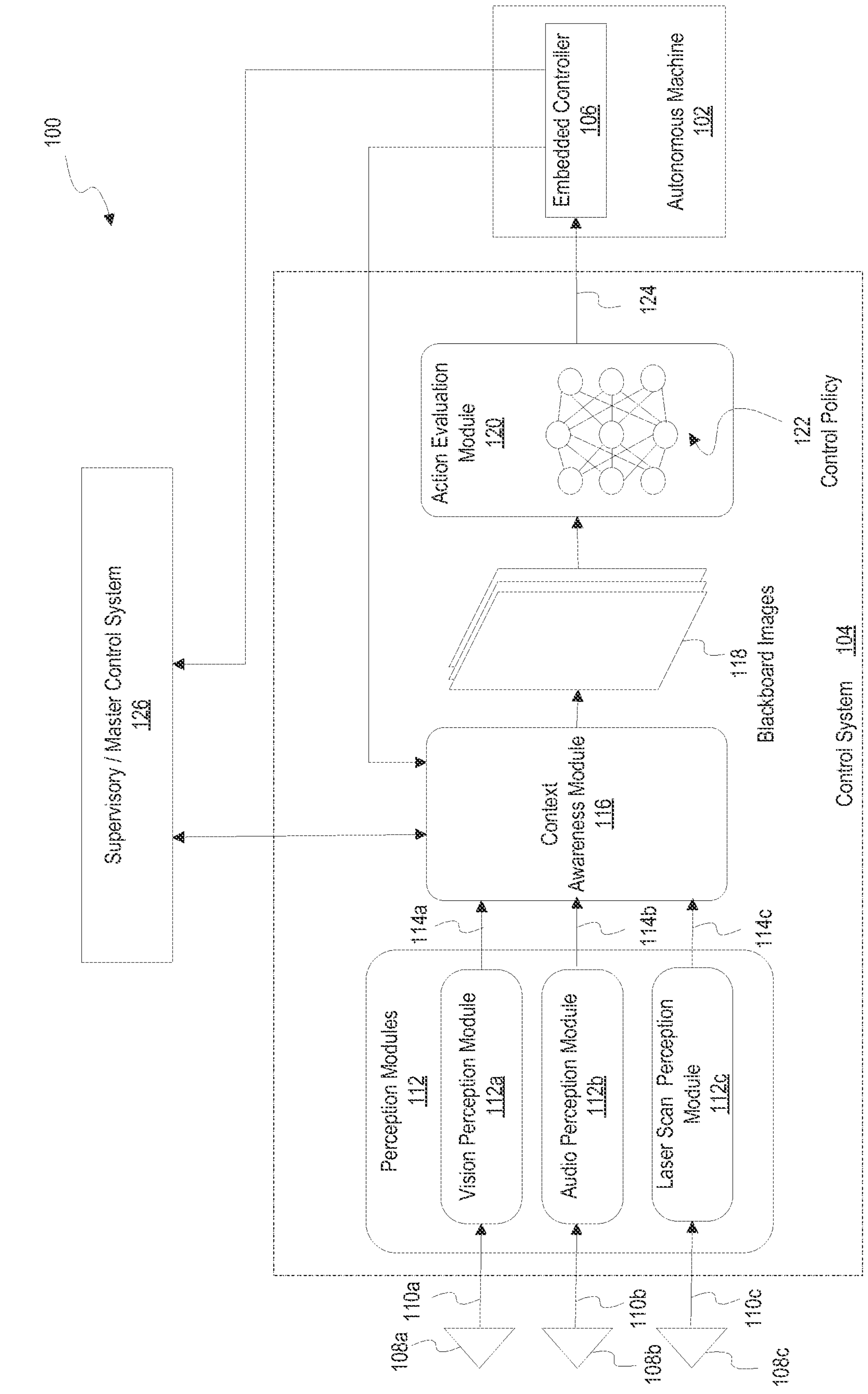
FIG. 1 schematically illustrates a system according to an example embodiment of the present disclosure.

Various technologies that pertain to systems and methods will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

The present disclosure proposes a novel methodology to fuse multiple sensor inputs and generate controls for a close loop control system. In the following description, an example of an automated guide vehicle (AGV) is used to illustrate aspects of the disclosed methodology. However, the disclosed methodology is not limited to AGVs but can be used for other autonomous machinery, such as robots, drones, autonomous vehicles, systems with physical embodiments) or autonomous software systems (working in a data environment), etc.

Taking the example of an AGV, to realize full autonomy, an AGV may use rich sensor input, such as RGB-Depth camera images, directional microphone data and laser scanner data, to sense the context and drive the AGV autonomously. One simple implementation can be to translate the rich context represented by the sensor inputs into the traditional track deviation and odometry information (e.g. virtual track deviation, vision odometry) mentioned above. However, this can lead to a significant amount of information from the sensors being lost that could potentially be useful for more advanced controls. For instance, the camera can be used by the AGV to detect a human worker and ensure their safety during autonomous movement, while following a target path, in a similar way to how a human driver would move. It is desirable for a fully autonomous AGV to be able to assess the dynamics and other properties of the objects in the scene and the temporal dimension relative to the future evolution of the context, to determine a course of action (e.g., to accelerate or decelerate by certain amounts, correct the steering, or even fully press on the brakes for a complete and immediate stop; actions could also include control of lights, lasers, and sounds to make transparent to human users around the AGV what the AGV plans to do next, analogous to the left/right signaling when driving a vehicle).

An improved control system, which is capable of processing rich context sensor data, understanding the context defined by the sensor data and generating control commands based on context derived from sensor data in real time, can be a key enabler for a fully autonomous machine, such as an AGV. For example, a control system that can detect humans, other vehicles, or objects around the AGV and determine an appropriate control action, can enable the AGV to work in a realistic environment along with human workers. Learning both, the context from sensor data and the action to be taken, in one step, is theoretically possible from a computational perspective, but can be very difficult to implement in practice.

One solution to implement generation of control action from context may involve using a rule-based control algorithm. A rule-based control algorithm is based on a set of rules, typically implemented in code, where the set of rules can include, for example, a table or knowledgebase of pre-conditions and control actions to be taken if one or more of the pre-conditions are met. However, implementing a rule-based control for autonomous machinery can potentially lead to complexities such as conflicting actions, for example, resulting due to multiple pre-conditions being met and conflicting actions being recommended.

A second approach, involving a black-box system to learn the context-action mapping, for example, using deep neural networks (DNN), has been attempted in the recent literature, but with limited success in real-world applications. This approach typically involves processing images (or other types of sensor data) directly by a black-box system (e.g., a DNN) to determine a control action. One of the challenges associated with the black-box approach is that the number of corner cases can be extremely large (virtually infinite), and the training data may not be able to represent such a wide variability in the operating environment (e.g., number, position, orientation and type of objects around the AGV), whereby offering performance guarantees is often impractical. Furthermore, a black box system, such as a DNN, can offer very little possibility for understanding and interpreting the internal representations created using the black box system.

The disclosed methodology can process rich context sensor data to extract perception information and fuse the extracted perception information by placing the extracted perception information onto a blackboard data structure in real time, to create a "blackboard image" using a controlled semantic that represents a context of the autonomous machine to be controlled. The blackboard image can comprise a continually updated data structure that defines an evolution of context with time. A stream of blackboard images may be processed to determine a control action using a control policy that includes a learned mapping of context to control action using training data in which contexts are represented by blackboard images created using the controlled semantic.

An inventive aspect of the disclosed methodology is based on the recognition that a control policy based on context-action mapping can be learned much easier from a collection of blackboard images rather than rich/high-bandwidth sensor data. Thus, according to the disclosed methodology, sensor data, such as image data, is not directly processed by the control policy, but first abstracted into an intermediate representation (i.e., a blackboard image) that can represent context in a more consistent physically grounded manner than real-world images and is not sensitive to variability in the real-world operating environment of the autonomous machine.

The expression "fusion", as used in this specification, refers to an integration of data from multiple sources (in this case, perception information from multiple perception modules) to produce consistent information, where pieces of information can complement one another.

The expression "blackboard data structure", as used in this specification, is a type of data structure that allows multiple processes (e.g., perception processes executed by a number of perception modules) to write information to a common data store.

The expression "blackboard image", as used in this specification, refers to an image representation derived from a blackboard data structure. A blackboard image is thus a representation of an operating environment of the autonomous machine derived from fusion of perception information using a controlled semantic, which can consistently define a context of the autonomous machine.

The expression "controlled semantic", as used in this specification, refers to a defined logic for representing perception information (e.g., perceived objects and their location, direction, orientation, dynamic properties, etc.) in a blackboard image irrespective of the modality of perception. The same controlled semantic is used for creating the blackboard images, both, during training of the control policy, as well as during execution of the trained control policy for controlling the autonomous machine. Sensor data may come from real or simulated environments.

The expressions "object" or "perceived object", as used in this specification, can refer to static or moving objects that can influence a behavior of the autonomous machine, including machinery, vehicles, obstacles, humans, among others.

Turning now to the drawings, FIG. 1 illustrates a system 100 according to an example embodiment of the present disclosure. The system 100 includes at least one autonomous machine 102 and a control system 104 for controlling the autonomous machine 102. In the illustrated example, the at least one autonomous machine 102 includes an AGV. In embodiments, the system 100 may comprise a fleet of AGVs on a factory floor controlled individually by respective control systems and coordinated by a supervisory or master control system 126.

The control system 104 can comprise, for example, an industrial PC, an edge device, or any other computing system. Such a computing system may be embedded in the autonomous machine 102 or may be located separately from the autonomous machine (e.g., as part of a centralized control system). The computing system may comprise one or more processors and a memory storing algorithmic modules executable by the one or more processors. The algorithmic modules include a plurality of perception modules 112, a context awareness module 116 and an action evaluation module 120, among other modules. The various modules described herein, including the perception modules 112, the context awareness module 116 and the action evaluation module 120, including any components thereof, may be implemented by the control system 104 in various ways, for example, as hardware and programming. The programming for the modules 112, 116 and 120 may take the form of processor-executable instructions stored on non-transitory machine-readable storage mediums and the hardware for the modules may include processors to execute those instructions. The processing capability of the systems, devices, and modules described herein, including the perception modules 112, the context awareness module 116 and the action evaluation module 120 may be distributed among multiple system components, such as among multiple processors and memories, optionally including multiple distributed processing systems or cloud/network elements.

Generally described, the plurality of perception modules 112, for example, including perception modules 112*a*, 112*b*, 112*c*, may acquire sensor data 110*a*, 110*b*, 110*c* respectively streamed via a plurality of sensors 108*a*, 108*b*, 108*c* which may be calibrated with respect to a common real world reference frame centered on the autonomous machine 102. The plurality of perception modules 112*a*, 112*b*, 112*c* are configured to process the acquired sensor data 110*a*, 110*b*, 110*c* to extract perception information 114*a*, 114*b*, 114*c* from the sensor data 110*a*, 110*b*, 110*c* in real time. The context awareness module 116 is configured to fuse the extracted real time perception information 114*a*, 114*b*, 114*c* from the plurality of perception modules 112*a*, 112*b*, 112*c* to create a blackboard image 118. The blackboard image 118 is a representation of an operating environment (i.e, a snapshot thereof) of the autonomous machine 102 derived from fusion of the extracted perception information 114*a*, 114*b*, 114*c* using a controlled semantic, which defines a context of the autonomous machine 102. The streamed sensor data 110*a*, 110*b*, 110*c* is thus transformed into a stream of blackboard images 108 defining an evolution of context of the autonomous machine 102 with time. The action evaluation module 120 is configured to process the stream of blackboard images 118 using a control policy 122 to output a control action 124 to be executed by the autonomous machine 102. The control policy 122 comprises a learned mapping of context to control action using training data in which contexts are represented by blackboard images created using the controlled semantic.

The autonomous machine 102 can comprise an embedded controller 106, such as an embedded programmable logic controller (PLC), an open controller, or any other type of controller configured to transform high-level instructions representing the control action 124 into low level control signals to control one or more actuators of the autonomous machine 102, such as motors for controlling speed and/or orientation of the AGV. In embodiments, the control action 124 may be suitably communicated by the control system 104 to the embedded controller 106 using the OPC UA standard machine-to-machine communication protocol, where the control system 104 may be configured as an OPC UA server and the embedded controller 106 as an OPC UA client The sensors 108*a*, 108*b*, 108*c* may be positioned at any location suitable for acquiring sensor data 110*a*, 110*b*, 110*c* that best captures the situational context of the autonomous machine 102 (e.g., minimizing noise, artifacts, etc.) and desirably providing redundancy. In one implementation, one or more of the sensors 108*a*, 108*b*, 108*c* may be mounted at a suitable location on the AGV/autonomous machine 102. For the sake of clarity and generalization, in FIG. 1, the sensors 108*a*, 108*b*, 108*c* are shown separately from the autonomous machine 102. The sensors 108*a*, 108*b*, 108*c* may be commonly calibrated in relation to a real world reference frame so that location and/or orientation of perceived objects can be consistently measured relative to that reference frame. In the disclosed embodiment, the reference frame is centered on the AGV/autonomous machine 102, in relation to which location and/or orientation of perceived objects are measured.

The plurality of sensors 108*a*, 108*b*, 108*c* can comprise multiple modalities of sensors (e.g., vision, audio, laser, or other types). Correspondingly, the plurality of perception modules 112*a*, 112*b*, 112*c* may be associated with multiple modalities of perception. In various embodiments, any number of different modalities of sensors may be used along with associated perception modules. For example, multiple vision, audio or laser sensors may be mounted both at the front and rear ends of the AGV. As per the disclosed embodiments, the sensors may be arranged so as to capture a 360 degrees field of view (FoV), which can be a 2D planar FoV of view or 3D spatial FoV, around the autonomous machine 102.

The sensor 108*a* may include a camera configured to stream vision data 110*a* comprising image frames to the control system 104. An image frame captures a scene of the operating environment of the autonomous machine 102 from the viewpoint of the camera 108*a*. The camera 108*a* can include, for example, an RGB camera, configured to stream image frames in red, green and blue color channels. Desirably, the camera 108*a* may include an RGB-D camera, configured to stream image frames using an additional "depth" channel, referred to as depth frames. A depth frame is an image frame channel that contains information relating to the distance of the surfaces of scene objects from a viewpoint. The camera 108*a* may be configured to stream vision data 110*a* as time series data comprising a stream of image frames, where each image frame can have multiple channels. The camera 108*a* can be located, for example, at or near a front end of the AGV/autonomous machine 102. In some embodiments, additional cameras may be employed, for example, including at least one camera located at or near a rear end of the AGV/autonomous machine 102.

The streamed vision data 110*a* may be processed by a vision perception module 112*a* to extract perception information 114*a*. In examples, the vision perception module 112*a* may comprise artificial intelligence (AI)-based or computer vision-based object detection algorithms for processing the streamed vision data 110*a* frame-by-frame to localize and classify perceived objects in the image frames.

Object detection is a problem that involves identifying the presence, location, and type of one or more objects in a given image. It is a problem that involves building upon methods for object localization and object classification. Object localization refers to identifying the location of one or more objects in an image and drawing a contour or a bounding box around their extent. Object classification involves predicting the class of an object in an image. Object detection combines these two tasks and localizes and classifies one or more objects in an image. Many of the known object detection algorithms work in the RGB (red-green-blue) color space.

In one embodiment, the vision perception module 112*a* may comprise a trained object detection neural network. The object detection neural network may be trained on a dataset including images of objects of interest and classification labels for the objects of interest in a supervised learning process. Once trained, the object detection neural network can receive an input image frame and therein predict contours segmenting perceived objects in the image frame or predict bounding boxes for perceived objects in the image frame, along with class labels for each perceived object. For example, the object detection neural network may comprise a segmentation neural network, such as a mask region-based convolutional neural network (Mask R-CNN). Segmentation neural networks provide pixel-wise object recognition outputs. The segmentation output may present contours of arbitrary shapes as the labeling granularity is done at a pixel level. According to another example, the object detection neural network may comprise a YOLO ("You Look Only Once") model, which outputs bounding boxes (as opposed to arbitrarily shaped contours) representing perceived objects and predicted class labels for each bounding box (perceived object).

Other examples of object detection algorithms can include non-AI based conventional computer vision algorithms, such as Canny Edge Detection algorithms that can apply filtering techniques (e.g., a Gaussian filter) to a color image, apply intensity gradients in the image and subsequently determine potential edges and track the edges, to arrive at a suitable contour for a perceived object.

In some embodiments, where the sensor 108*a* comprises an RGB-D camera, the vision perception module 112*a* may furthermore process the depth frames to extract depth information for perceived object(s) in an image frame (for example, perceived via object detection algorithms described above), to infer a distance of the perceived object(s) in relation to the autonomous machine 102

Thus, in an example implementation, the perception information 114*a* extracted by the vision perception module 112*a* from an image frame may comprise:

- a time stamp or frame ID;
- one or more bounding boxes, each bounding box localizing a perceived object; and
- for each bounding box,
  - the coordinates (x, y) of the center, for example, relative to a grid cell,
  - the dimensions (w, h) of the bounding box, for example, normalized relative to image size,
  - a classification label, which may define a class or type for a perceived object in the bounding box (e.g., "human", "forklift", "vehicle", etc.),
  - a class confidence score, which may measure the confidence on both the classification and the localization, and
  - depth, which may measure a distance of the perceived object/bounding box from the autonomous machine (may additionally include a depth confidence interval).

The vision perception module 112*a* may additionally comprise algorithms to filter and smoothen the extracted perception information (e.g., outlier elimination) given the properties of the operating environment of the autonomous machine 102. In one embodiment, the vision perception module 112*a* may assign a tracking ID to each perceived object/bounding box. The tracking ID may include a newly assigned tracking ID or an old tracking ID based on a comparison of a current image frame with a previous image frame. The tracking IDs may be used to track the position of the perceived objects over time, for example, using a Kalman filter. Tracking the position of perceived objects over time can provide increased transparency for the purpose of verifying and validating the learned control policy 122, and/or may be utilized to invoke a rule-based control (e.g., in a hybrid control system including a combination of learned control policy and rule-based control) based on a tracked position of an object, for example, to stop or slow down the AGV when a perceived object is approaching an "unsafe" zone in relation to the AGV.

The sensor 108*b* may include an adaptive directional microphone. An "adaptive" directional microphone refers to one that does not have a fixed angle of sensitivity but can be electronically controlled to automatically change the direction in which it is pointing based on received audio signals. An adaptive directional microphone may be implemented, for example, by a linear microphone array, or a spherical microphone. The adaptive directional microphone 108*b* may be configured to stream audio data 110*b* as time series data to the control system 104. The streaming audio data 110*b* may be produced based on audio signals captured by the adaptive directional microphone 108*b* in the operatizing environment of the autonomous machine 102. The adaptive directional microphone 108*b* can be located, for example, at or near a front end of the AGV/autonomous machine 102. In some embodiments, additional adaptive directional microphones may be employed, for example, including on the sides and/or at the rear end the AGV/autonomous machine 102.

The streamed audio data 110*b* may be processed by an audio perception module 112*b* to detect and directionally locate audio signals transmitted by one or more objects in the operating environment of the autonomous machine 102. In embodiments, the audio perception module 112*b* may comprise conventional audio signal processing algorithms and/or AI-based algorithms for detecting one or more types of audio events from the time series of audio data 110_b_ and directionally locating the detected audio events by computing a direction-of-arrival (DOA). DOA refers to a direction from which a propagating wave arrives at a point where a sensor (e.g., directional microphone array) is located. An example of an audio event can comprise a warning sound (e.g., a beep) transmitted by another vehicle or machinery (e.g., a forklift). Another example of an audio event can comprise a voice of a human operator.

In one embodiment, the audio perception module 112_b_ may comprise a trained neural network to detect and classify audio events based on a learned mapping of audio events to classification labels. Thus, in an example implementation, the perception information 114_b_ extracted by the audio perception module 112_b_ from the time series audio data 110_b_ may comprise:

- a time stamp;
- a classification label for a detected audio event that can define a perceived object (e.g., "human" or "forklift");
- a confidence score associated with the classification; and
- DOA of the audio event that can define location information for the perceived object (may additionally include a DOA confidence interval).

The audio perception module 112_b_ may also comprise algorithms to filter the extracted perception information given the properties of the operating environment of the autonomous machine 102. Such algorithms may include a smoothing filter (for outlier elimination), Kalman filter (for tracking), among others.

In a further embodiment, the audio perception module 112_b_ may additionally comprise a speech recognition module (e.g., an AI-based algorithm) for transforming a detected "voice" audio event into a machine-understandable text command. The text command may be utilized, for example, to implement a rule-based control by the action evaluation module 120, for example, to override the deployed control policy 122 based on an operator command (e.g., in a hybrid control system including a combination of learned control policy and rule-based control).

The sensor 108_c_ may include a laser scanner configured to sense a presence of an obstacle within its range. The range of the laser scanner may be defined by a scanning angle range and a field (distance) range. The laser scanner 108_c_ may be configured to stream laser sensor data 110_c_ as time series data to the control system 104. The laser scanner 108_c_ can be located, for example, at a front corner location of the of the AGV/autonomous machine 102. In some embodiments, additional laser scanners may be employed, for example, including at a rear corner location of the AGV/autonomous machine 102.

The laser sensor data 110_c_ may be processed by a laser scan perception module 112_c_. The laser scan perception module 112_c_ may comprise signal processing algorithms for processing the time series laser sensor data 110_c_ to perceive a presence of an obstacle within a defined range from the autonomous machine 102 and infer a distance of the perceived obstacle in relation to the autonomous machine 102. The perception information 114_c_ extracted by the laser scan perception module 112_c_ may comprise, for example, a time stamp and a map of detected obstacles and their distance from the autonomous machine 102 within the range of the laser scanner 108_c_. The laser scan perception module 112_c_ may additionally comprise algorithms to filter the extracted perception information given the properties of the operating environment of the autonomous machine 102 (e.g., smoothing filter, Kalman filter, etc.).

The context awareness module 116 may fuse the perception information 114_a_, 114_b_, 114_c_ extracted by the plurality of perception modules 112_a_, 112_b_, 112_c_ to create a blackboard image 118 in real time that defines an immediate context of the autonomous machine 102. The fusion may be executed, for example, based on time stamps associated with the perception information 114_a_, 114_b_, 114_c_ extracted by the various perception modules 112_a_, 112_b_, 112_c_.

The blackboard image representation can declutter the large amount information available from the rich sensor data to represent only the essential features necessary to interpret the context of the autonomous machine 102 in a consistent manner using a controlled semantic. For example, the blackboard image 118 can comprise a graphical representation of the operating environment of the autonomous machine 102 including one or more perceived objects (including humans) and their inferred location in relation to the AGV/autonomous machine 102, using the controlled semantic. The "inferred location" may refer to a determined exact location or a locus (i.e., a region on uncertainty) of the perceived object. As per the disclosed embodiment, the blackboard image may depict a 360 degrees field of view (2D or 3D) around the autonomous machine 102. In examples, to provide better understanding of the context, the graphical representation may further include one or more of: lanes as intended to be followed by the AGV 102; dynamic properties (e.g., velocity) of perceived objects in motion, if known; static objects that restrict movement in the lane (obstacles); orientation relative to orientation of the AGV 102; safe or unsafe zones for different objects in relation to the AGV 102; and/or any other feature necessary to interpret the context. The graphical representation may include, for example, a 2D bird's eye view or a 3D perspective view.

In embodiments, the context awareness module 116 may fuse perception information extracted via multiple modalities of perception (e.g., front and rear cameras, front and rear microphones, etc.) to locate multiple perceived objects on the blackboard image 118. For example, an object perceived by a vision perception module may be represented on the blackboard image 118 based on the coordinates and depth of the bounding box associated with the perceived object. An object perceived by an audio perception module may be represented on the blackboard image 118 by the DOA of the audio event associated with the perceived object. When the same object (e.g., identified by its classification label) is perceived by multiple modalities of perception (e.g., vision and audio), the context awareness module 116 may combine the location information of the perceived object extracted by the multiple modules (e.g., bounding box location/depth+DOA) to infer the location of the perceived object on the blackboard image 118 (e.g., based on respective confidence scores of perception, region of intersection, etc.). In some embodiments, location information may be represented by regions of uncertainty or loci of perceived objects, which can be based on confidence intervals of depth, DOA, etc.

According to the disclosed embodiment, the supervisory/master control system 126 may comprise an industrial controller, such as a PLC, which can receive status signals, including odometry, speed, and orientation information communicated by embedded controllers of individual AGVs in the fleet (e.g., measured by wheel encoders) and communicate the same to the control system 104. The context awareness module 116 may utilize such information to better define the context of the AGV 102 using the blackboard image 118. For instance, dynamic properties, such as velocity, of certain perceived objects (e.g., other vehicles) and that of the AGV 102 may be graphically represented on the blackboard image 118, for example, using vectors. Velocity information of the AGV 102 may be further used, for example, to dynamically define "safe" or "unsafe" zones for different objects in relation to the AGV 102 in the blackboard image 118. To that end, the context awareness module 116 may include a dynamic safety zone configurator module to define the safe or unsafe zones based on dynamic properties, such as speed, of the AGV 202. Odometry and orientation information of the AGV 102 may be used, for example, to define a position of the AGV 102 in relation to intended lanes represented in the blackboard image 118. The intended lanes may be represented, for example, using a navigation map used for autonomous driving of the AGV 102. In some embodiments, odometry, speed, and orientation information of the AGV 102 may be directly obtained by the control system 104 via the embedded controller 106 of the AGV 102.

A blackboard image 118 thus provides an explainable representation of context on the basis of which control action can be determined. To provide improved transparency to an operator, the stream of blackboard images 118 created at runtime by the context awareness module 116 may be communicated to the supervisory/master control system 126, for visualization via a human machine interface (HMI) device.

Figure 2:
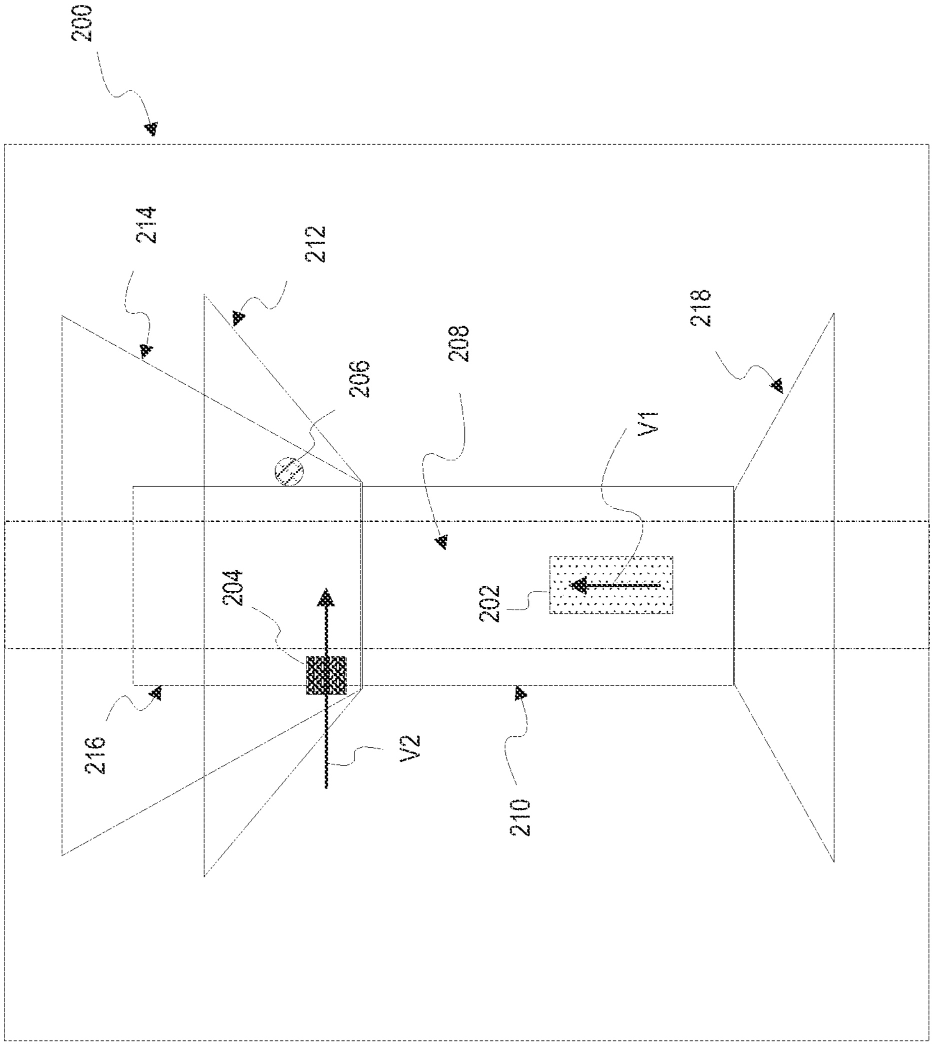
FIG. 2 schematically illustrates a blackboard image based on a fusion of perception information, according to an example embodiment.

FIG. 2 shows an illustrative example of a blackboard image 200 defining a context of an autonomous AGV. In the shown example, the blackboard image 200 comprises a diagrammatical representation depicting a 2D bird's eye view of an immediate operating environment of the AGV. The blackboard image 200 graphically represents the AGV (or "self") 202 and perceived objects 204, 206 in the immediate environment of the AGV/self 202. Each perceived object 204, 206 may be identified (classified) and located on the blackboard image 200 based on perception information extracted via one or multiple perception modules, for example, as described above. For example, the perceived object 204 may be identified as a "vehicle" and the perceived object 206 may be identified as a "human". The blackboard image 200 may use a controlled semantic to consistently represent the AGV/self 202 and the perceived objects 204, 206 irrespective of the modality of perception, for example, using a defined color and/or shape and/or icon to represent different classes of objects and the AGV/self. As shown, the AGV/self 202 can be represented as a rectangle having a first color (represented herein by a first type of shading), the perceived "vehicle" 204 can be represented as a square having a second color (represented herein by a second type of shading), and the perceived "human" 206 can be represented as a circle having a third color (represented herein by a third type of shading).

The blackboard image 200 may also represent lanes intended to be followed by the AGV. In FIG. 2, a lane for the AGV/self 202 is represented by a strip 208 delineated by dashed lines. In some embodiments, the AGV lanes may be represented by a defined color indicating free space. Static obstacles that restrict a lane may be represented by a specific color.

To further define the context, known dynamic properties, such as velocity, of the AGV/self and the perceived objects (e.g., obtained as described above), may be graphically represented on the blackboard image using a controlled semantic. For example, as shown in FIG. 2, known velocities of the AGV/self 202 and the perceived "vehicle" 204 can be represented as arrows that define velocity vectors V1 and V2 respectively, indicative of both magnitude and direction. As shown, the arrows V1 and V2 may be positioned on the center of mass of the respective object/AGV.

Still further, the blackboard image may graphically represent defined safe or unsafe zones for different objects. For example, as shown in FIG. 2: the rectangular zone 210 immediately surrounding the AGV/self can represent an unsafe zone for all object classes; the trapezoidal zone 212 can represent an unsafe or warning zone for humans; the trapezoidal zone 214 can represent an unsafe or warning zone for moving objects (e.g., vehicles, forklifts, etc.) other than humans; the rectangular zone 216 can represent an unsafe zone for static objects; and the trapezoidal zone 218 can represent an unsafe zone for objects behind the AGV/self 202. The zones 210, 212, 214, 216 and 218 may be determined by a dynamic safety zone configurator module based on a dynamic property (e.g., velocity magnitude) of the AGV/self 202 (e.g., smaller zone heights for low AGV speeds, larger zone heights for high AGV speeds).

In some embodiments, context may be better represented by uncertainty depending on the characteristics of the sensors and/or perception modules. In this case, the blackboard image may graphically represent the uncertainty with respect to the inferred location of a perceived object.

Figure 3:
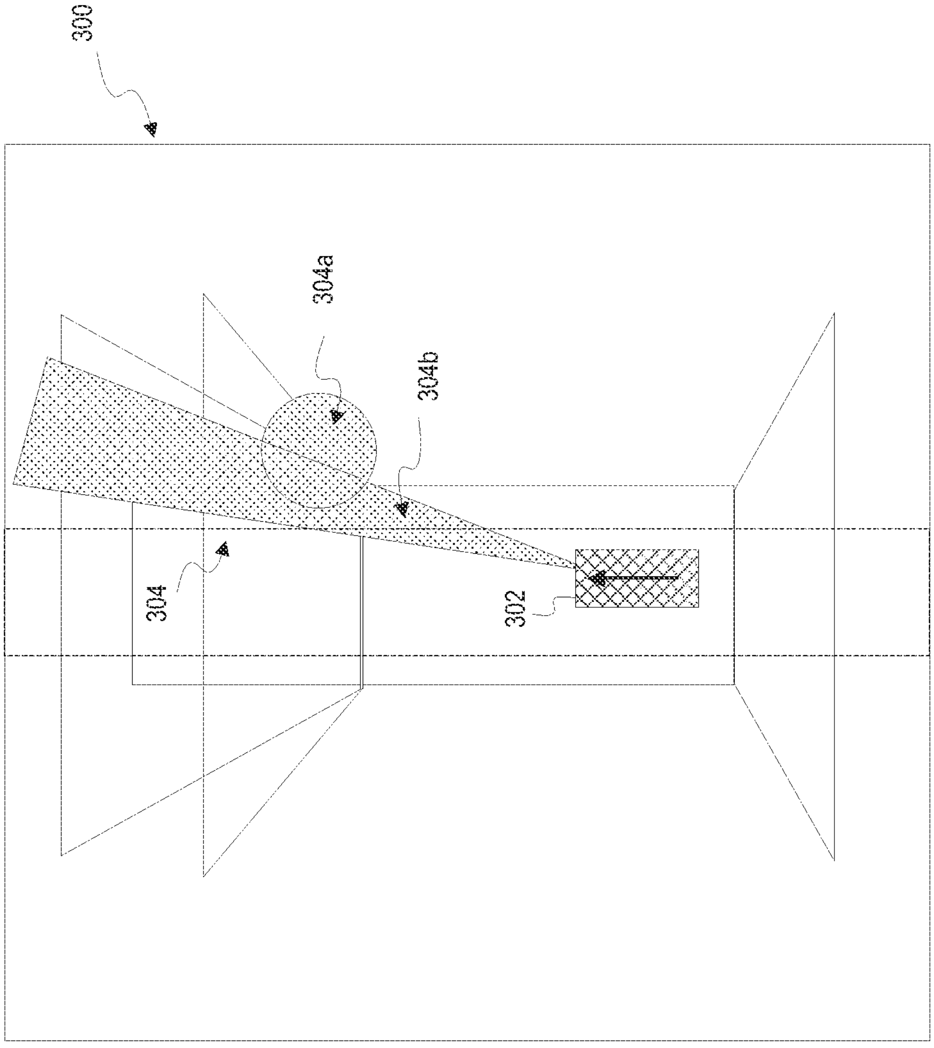
FIG. 3 schematically illustrates a blackboard image based on a fusion of perception information, according to another example embodiment.

As an illustrative example, FIG. 3 shows a blackboard image 300 where the AGV/self is represented by the rectangle 302. The AGV lane and safety zones are represented similar to FIG. 2 and hence will not be described again. However, FIG. 3 uses a different semantic for representing perceived objects in relation to FIG. 2. Herein, a perceived object is represented by a region of uncertainty or a locus as inferred via one or multiple perception modules. In the shown example, a perceived object 304 is represented by an uncertainty defined by a first region 304*a* and a second region 304*b*. The first region 304*a* is a sphere (shown in 2D as a circle) representing a locus or region of uncertainty of the perceived object 304 inferred by a vision perception module. The region of uncertainty 304*a* may be computed, for example, based on a depth confidence interval of the vision perception module. The second region 304*b* is a cone (shown in 2D as a triangle) representing a locus or region of uncertainty of the perceived object 304 inferred by an audio perception module. The region of uncertainty 304*b* may be computed, for example, based on a DOA confidence interval of the audio perception module. In the same manner, multiple perceived objects may be represented in the blackboard image by one or more regions of uncertainty. The regions of uncertainty may be distinguished, for example, by using defined colors, to represent different objects.

Turning back to FIG. 1, the action evaluation module 120 may process a stream of blackboard images 118 created by the context awareness module 116 using a control policy 122 to determine a control action 124. The control policy 122 may comprise a learned mapping of context to control action using training data in which contexts are represented by blackboard images. As per the disclosed embodiment, the control policy 122 may comprise a DNN, although other machine learning models (e.g., neural ordinary differential equations) may be used. To suitably process the temporally dynamic evolution of context, the DNN may include a recurrent neural network (RNN) that can process the stream of blackboard images 118 as time series input data to determine the control action 122.

The control policy 122 may be trained on a defined action space. Continuing with the example of an AGV, the action space may comprise the following actions:

STOP
RESUME

STEER (degrees)
SLOW DOWN (e.g., to a fixed % of cruising speed)
REPLAN
OUTPUT AUDIO (e.g., including advice, warning, etc. in a determined direction and/or spatial volume)
NULL (take no action)

Based on the input stream of backboard images 118, the control policy 122 may output one or multiple non-conflicting control actions from the action space based on the learned context-action mapping. An example of multiple control actions can include, for example, an action to slow down the AGV and an action to output an audio warning, for example, when the presence of a human is perceived in a defined unsafe or "warning" zone.

In embodiments, the action evaluation module 120 may comprise other components in addition to the learned control policy 122. For example, in some embodiments, the action evaluation module 120 may also include a rule-based control algorithm to assist the learned control policy 122 under certain defined conditions (hybrid control).

In some embodiments, the control system 104 may include a conventional navigation module configured to automatically navigate the AGV 102 using a map of the factory floor. The navigation module may be configured to navigate the AGV 102 based on sensor information including odometry, speed, obstacle detection, etc. The disclosed control policy 122 may, in this case, determine control actions 124 that can assist or override the automatic navigation based on an interpretation of the evolution of context of the AGV 102 using the stream of blackboard images 118. For certain contexts, the control policy 122 may output a "null" or no control action. In this case, the conventional navigation module may assume default control of the AGV 102. In other embodiments, the control policy 122 may be trained on a large action space to implement complete navigational functions, thereby replacing the conventional navigation module entirely.

In one embodiment, the control policy 122 may not be implemented continuously but may be triggered upon detection of a perception event. A perception event can be a defined change in the context of the autonomous machine 102 represented by a current blackboard image in relation to the previous blackboard image(s) in the stream of blackboard images 118. Non-limiting examples of defined changes that can be used as perception events to trigger the control policy 122 can include: a new object is perceived in the current blackboard image that was not perceived in the previous blackboard image(s); an object already perceived in the previous blackboard image(s) now enters a dynamically defined unsafe zone pertaining to its object class in the current blackboard image; or any other criteria that may be statically or dynamically defined.

Figure 4:
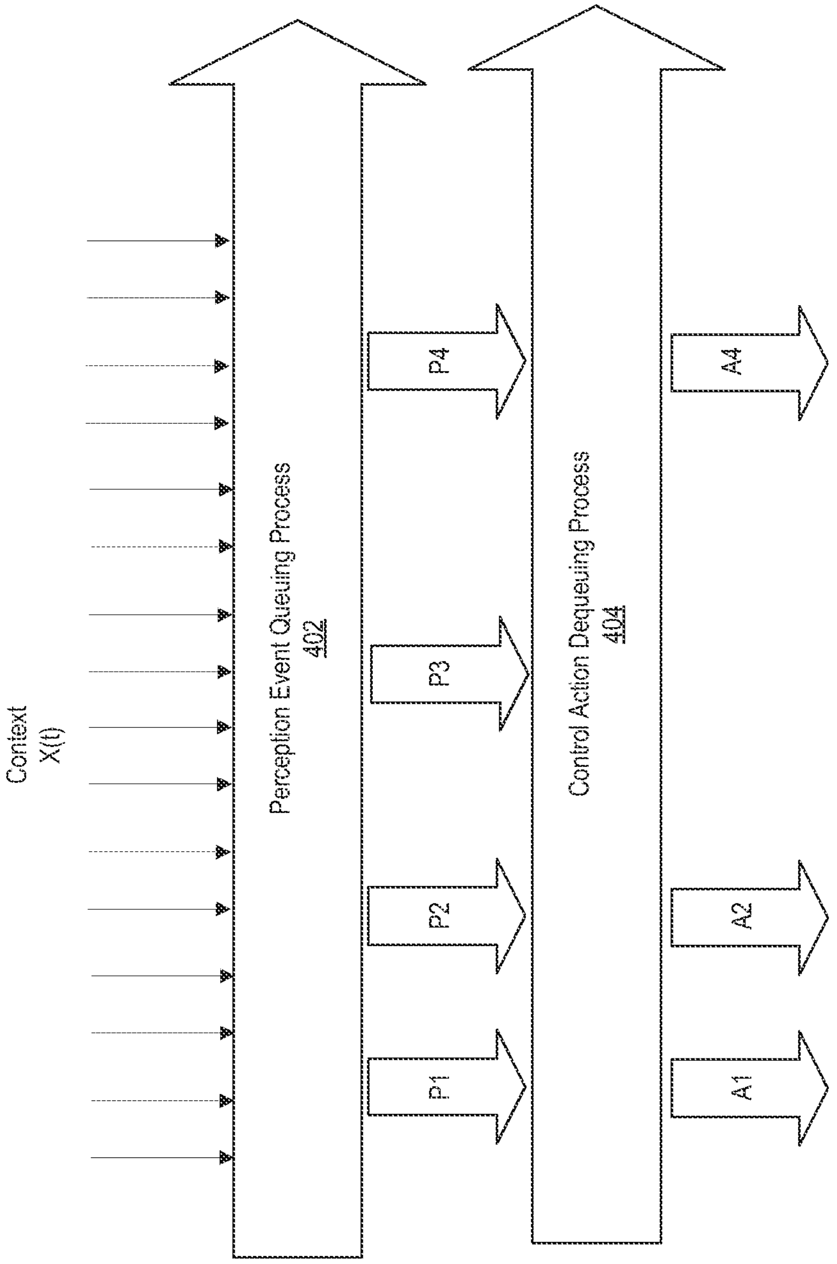
FIG. 4 schematically illustrates the execution of perception and control action processes according to an exemplary embodiment.

To illustrate, as shown in FIG. 4, context X(t) (blackboard images) created continuously using the perception modules may be analyzed by a perception event queuing process 402 to generate a queue of perception events P1, P2, P3, P4. The perception events P1, P2, P3, P4 may be determined based on defined criteria, such as described above. The perception events P1, P2, P3, P4 may be processed by a control action dequeuing process 404 to determine control actions A1, A2, A4 using the control policy, which may be triggered in each instance by the respective perception events P1, P2, P3, P4. One or more perception events, such as the perception event P3 shown herein, may be processed by the control policy to output a "null" or no control action. By triggering the control policy based on perception events, the control policy may be implemented non-synchronously with respect to the perception modules, which can provide an efficient event-driven action mechanism.

Prior to deployment on the control system 104, the control policy 122 may be trained using training blackboard images that are created using the same controlled semantic as used for creating the blackboard images at runtime by the control system 104. During the training phase, sensor data may be acquired, which may include real streaming sensor data (e.g., from sensors mounted on an AGV driving along a factory floor) or simulated streaming sensor data (e.g., from a driving simulator simulating driving of an AGV on a factory floor). The acquired streaming sensor data, real or simulated, may pertain to multiple sensors in a respectively real or simulated operating environment of the autonomous vehicle 102. The training blackboard images may be created by extracting perception information from the real streaming sensor data or the simulated streaming sensor data (e.g., via perception modules, such as described above) and fusing the extracted perception information using the controlled semantic (e.g., via a context awareness module, such as described above). The training blackboard images can define a large number of different contexts of the autonomous machine 102, which can be utilized to learn a mapping of context to control action via a machine learning process.

Figure 5:
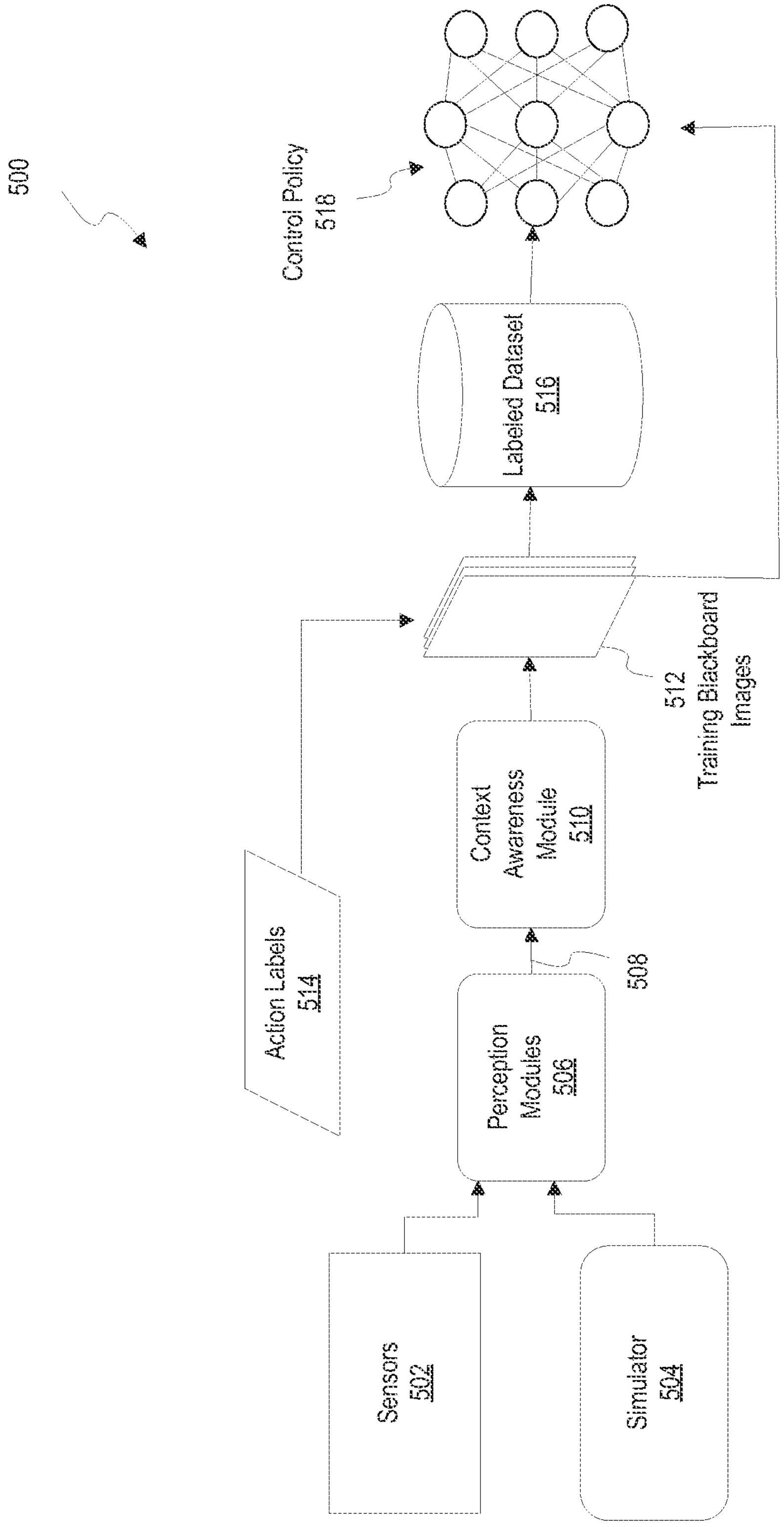
FIG. 5 schematically illustrates an example embodiment of a supervised learning process for training a control policy.

FIG. 5 illustrates a first example embodiment involving a supervised learning process 500 for training a control policy. Here, streaming sensor data pertaining to user-defined actionable scenarios can be acquired via multiple sensors 502, which may include one or more cameras, microphones, laser scanners, etc. (as described above) that may be mounted on an AGV driving on a factory floor. Additionally, or alternately, streaming sensor data pertaining to user-defined actionable scenarios can also be acquired via a simulator 504 (e.g., a user-operated driving simulator), for example, from scripts used as input to the simulator 504. In embodiments, a simulator 504 may enable a large number of graded or controlled variety of training blackboard images to be created, that can address the aforementioned challenges associated with corner cases.

The acquired streaming sensor data may be processed by perception modules 506 to extract perception information 508, which may be fused via a context awareness module 510 to create a number of training blackboard images 512. In embodiments, the perception modules 506 may be identical to or have functionality substantially similar to the above-described perception modules 112. Likewise, the context awareness module 510 may be identical to or have functionality substantially similar to the above-described context awareness module 116. The perception modules 506 and the context awareness module 510 will not be described further for the sake of brevity.

Training blackboard images 512 may be individually assigned respective classification labels, defined by action labels 514. Training blackboard images 512 created using the simulator 504 may be assigned an action label 514 automatically by the simulator 504. Training blackboard images 512 created using streaming sensor data from sensors 502 may be manually annotated with an action label 514. An action label 514 may comprise one or multiple non-conflicting control actions from a defined action space, such as described above. Training blackboard images 512 and the respective action labels 514 may comprise a labeled dataset 516, which can be used for training a control policy 518, which can comprise a DNN (e.g., an RNN). In embodiments, the labeled training blackboard images may comprise time series data defining evolution of context with time.

The supervised learning process may involve, for example, repeated adjustments of parameters (weights, biases, etc.) of the DNN 518 via back propagation utilizing the labeled dataset 516. After the completion of the supervised learning process, the DNN 518 may be tested and validated on unlabeled training blackboard images 512 and subsequently deployed on the control system 104 as a learned control policy 122.

Figure 6:
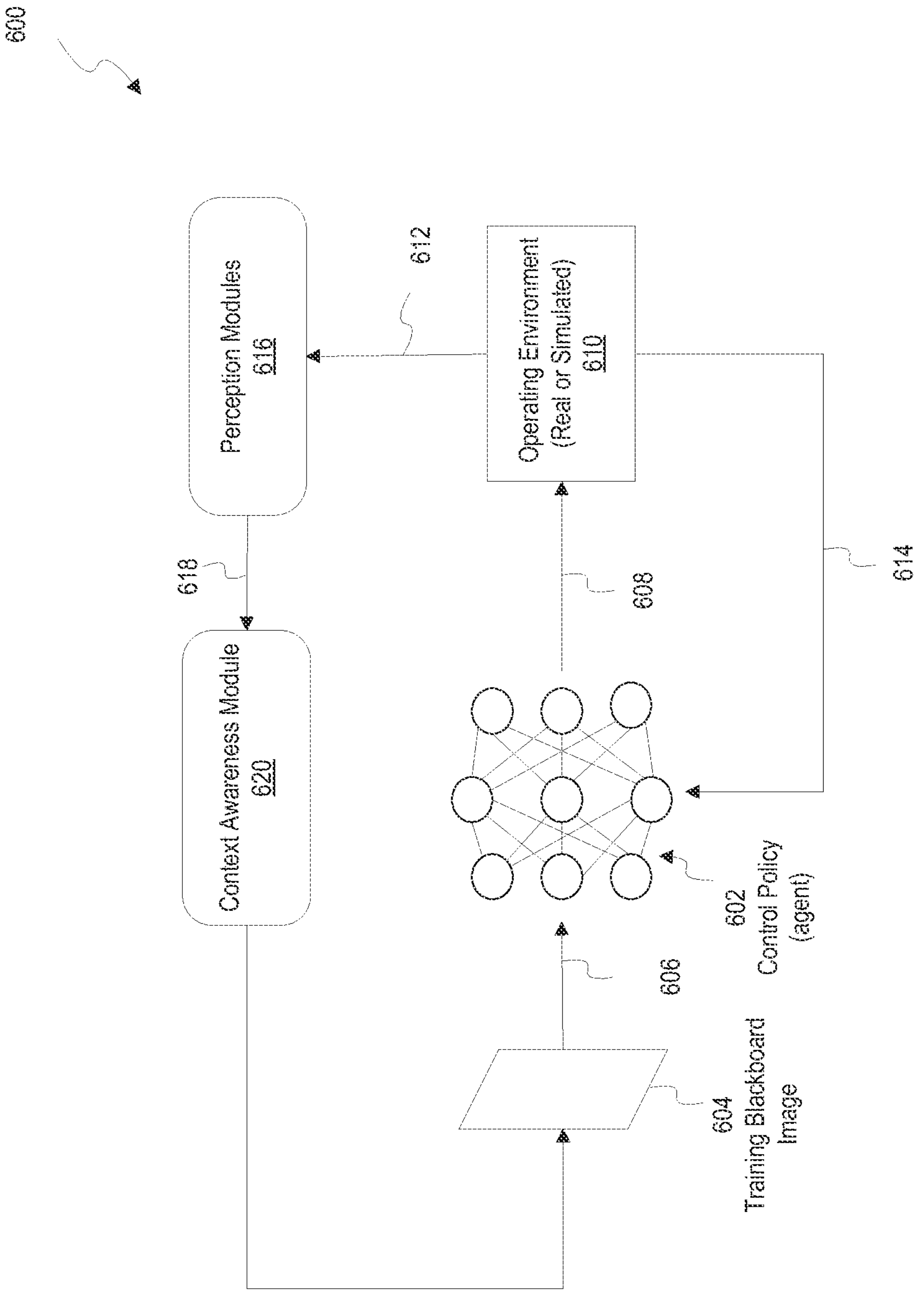
FIG. 6 schematically illustrates an example embodiment of a reinforcement learning process for training a control policy.

FIG. 6 illustrates a second example embodiment involving a reinforcement learning process 600 for training a control policy. As per the illustrated process 600, a control policy 602 (referred to as an "agent") 602, which can comprise a DNN (e.g., an RNN), may be trained using a learning engine iteratively over a sequence of steps. At each step, the agent 602 can take a system state 606 as input, to predict an action 608. The system state 606 may be a context defined by a training blackboard image 604 created based on fusion of perception information (from real or simulated sensor data) that represents an immediate operating environment of the AGV. In embodiments, the agent 602 may process the current training blackboard image 604 along with previous training blackboard images representing previous system states, as a time series input defining an evolution of context, to determine the action 608. The action 608 may include one or multiple non-conflicting control actions from a defined control action space, such as that described above.

The action 608 may be executed on an operating environment 610 of the AGV, which may comprise a real or simulated environment. The execution of the action 608 can, among other factors, result in a change of state of the operating environment 610. The state of the operating environment 610 may be measured via real or simulated streaming sensor data 612. The streaming sensor data 612 may be processed by perception modules 616 to extract perception information 618, which may be fused via a context awareness module 620 to create an updated training blackboard image 604 representing an updated system state 602.

In embodiments, the perception modules 616 may be identical to or have functionality substantially similar to the above-described perception modules 112. Likewise, the context awareness module 620 may be identical to or have functionality substantially similar to the above-described context awareness module 116. The perception modules 616 and the context awareness module 618 will not be described further for the sake of brevity.

After execution of the action 608, the agent 602 may collect a reward 614 from the operating environment 610. The reward 614 may be determined, for example, based on satisfaction of defined constraints and/or as a negative of a defined cost function (e.g., negative reward in case of deviating from lane, positive reward if slowing down when a perceived object is in a dynamically defined "unsafe" zone for that object class). The control policy 602 may be adjusted by updating parameters of the DNN (e.g., weights) based on the reward 614 using the learning engine.

The learning engine can comprise a policy-based learning engine, for example, using a policy gradient algorithm. A policy gradient algorithm can work with a stochastic policy, where rather an outputting a deterministic action for a state, a probability distribution of actions in the action space is outputted. Thereby, an aspect of exploration is inherently built into the agent 602. With repeated execution of actions and collecting rewards, the learning engine can iteratively update the probability distribution of the action space by adjusting the policy parameters (e.g., weights of the neural network). In another example, the learning engine can comprise a value-based learning engine, such as a Q-learning algorithm. Here, the learning engine may output an action having the maximum expected value of the cumulative reward over the episode (for example, applying a discount to rewards for future actions in the episode). After the action is executed and a reward is collected, the learning engine can update the value of that action in the action space based on the reward it just collected for the same action.

The agent 602, adjusted based on the reward 614, may then take the updated system state 606 (represented by the updated training blackboard image 604) as input, to predict an action 608. The process may thus iterate for over a number of steps till a convergence criterion is met. In one embodiment, the convergence criterion may include a specified number of steps. Subsequently, the agent 602 may be deployed on the control system 104 as a learned control policy 122.

Figure 7:
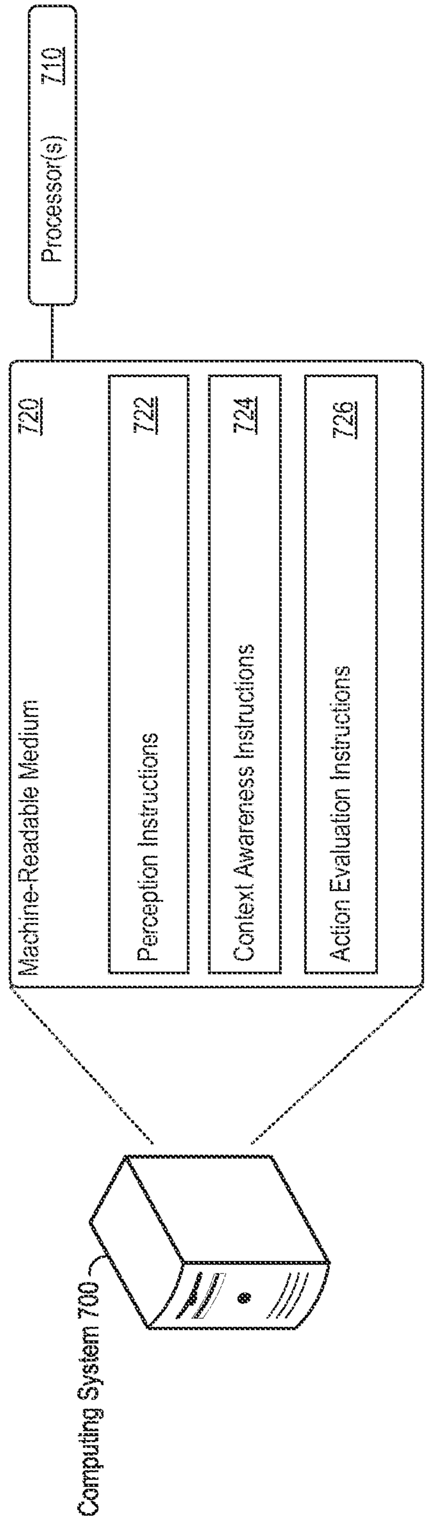
FIG. 7 schematically illustrates a system that can support controlling of an autonomous machine according to disclosed embodiments.

FIG. 7 shows an example of a computing system 700 that can support controlling of an autonomous machine according to disclosed embodiments. In examples, the computing system 700 may comprise one or more of an industrial PC, an edge computing device, among others that can embody the above-described control system 104. The computing system 700 includes at least one processor 710, which may take the form of a single or multiple processors. The processor(s) 710 may include a central processing unit (CPU), a graphics processing unit (GPU), a neural processing unit (NPU), a microprocessor, or any hardware device suitable for executing instructions stored on a memory comprising a machine-readable medium 720. The machine-readable medium 720 may take the form of any non-transitory electronic, magnetic, optical, or other physical storage device that stores executable instructions, such as perception instructions 722, context awareness instructions 724 and action evaluation instructions 726, as shown in FIG. 7. As such, the machine-readable medium 720 may be, for example, Random Access Memory (RAM) such as a dynamic RAM (DRAM), flash memory, spin-transfer torque memory, an Electrically-Erasable Programmable Read-Only Memory (EEPROM), a storage drive, an optical disk, and the like.

The computing system 700 may execute instructions stored on the machine-readable medium 720 through the processor(s) 710. Executing the instructions (e.g., the perception instructions 722, the context awareness instructions 724 and the action evaluation instructions 726) may cause the computing system 700 to perform any of the technical features described herein, including according to any of the features of the perception modules 112, the context awareness module 116 and the action evaluation module 120, as described above.

The systems, methods, devices, and logic described above, including the perception modules 112, the context awareness module 116 and the action evaluation module 120, may be implemented in many different ways in many different combinations of hardware, logic, circuitry, and executable instructions stored on a machine-readable medium. For example, these modules may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. A product, such as a computer program product, may include a storage medium and machine-readable instructions stored on the medium, which when executed in an endpoint, computer system, or other device, cause the device to perform operations according to any of the description above, including according to any features of the perception modules 112, the context awareness module 116 and the action evaluation module 120. Computer readable program instructions described herein can be downloaded to respective computing/processing devices from a computer readable storage medium or to an external computer or external storage device via a network, for example, the Internet, a local area network, a wide area network and/or a wireless network.

The processing capability of the systems, devices, and modules described herein, including the perception modules 112, the context awareness module 116 and the action evaluation module 120 may be distributed among multiple system components, such as among multiple processors and memories, optionally including multiple distributed processing systems or cloud/network elements. Parameters, databases, and other data structures may be separately stored and managed, may be incorporated into a single memory or database, may be logically and physically organized in many different ways, and may be implemented in many ways, including data structures such as linked lists, hash tables, or implicit storage mechanisms. Programs may be parts (e.g., subroutines) of a single program, separate programs, distributed across several memories and processors, or implemented in many different ways, such as in a library (e.g., a shared library).

The system and processes of the figures are not exclusive. Other systems, processes and menus may be derived in accordance with the principles of the disclosure to accomplish the same objectives. Although this disclosure has been described with reference to particular embodiments, it is to be understood that the embodiments and variations shown and described herein are for illustration purposes only. Modifications to the current design may be implemented by those skilled in the art, without departing from the scope of the appended claims.

What is claimed is:

1. A computer-implemented method for controlling an autonomous machine, comprising:

acquiring sensor data streamed via a plurality of sensors calibrated with respect to a common real world reference frame centered on the autonomous machine, processing the streamed sensor data by a plurality of perception modules to extract perception information from the sensor data in real time, wherein the perception information comprises at least one of perceived objects and their location, direction, orientation, and/or dynamic properties, fusing the extracted real time perception information from the plurality of perception modules based on time stamps associated with the perception information extracted by the plurality of perception modules by a context awareness module to create a stream of blackboard images, wherein each blackboard image is a snapshot of an operating environment of the autonomous machine derived from fusion of the extracted perception information using a controlled semantic, which defines a context of the autonomous machine, wherein the controlled semantic defines a logic for representing the perception information in the blackboard images irrespective of the modality of perception, wherein the stream of blackboard images defines an evolution of the context of the autonomous machine with time, and processing the stream of blackboard images by an action evaluation module using a control policy to output a control action to be executed by the autonomous machine, the control policy comprising a learned mapping of context to control action, the mapping being learned using training data in which contexts are represented by blackboard images created using the controlled semantic.

2. The method according to claim 1, wherein the plurality of sensors comprise multiple modalities of sensors and the plurality of perception modules are associated with multiple modalities of perception.

3. The method according to claim 1, wherein the plurality of sensors comprises at least one camera and the plurality of perception modules comprises at least one vision perception module configured to process vision data streamed via the at least one camera, wherein the method comprises processing image frames of the streamed vision data by the at least one vision perception module to locate and classify one or more objects of interest on the image frames, which define presence and location information of one or more perceived objects in the operating environment of the autonomous machine, as part of the perception information extracted by the at least one vision perception module.

4. The method according to claim 3, wherein the vision data streamed via the at least one camera further comprises depth frames, wherein the method comprises processing the depth frames by the at least one vision perception module to extract depth information for the one or more perceived objects, to infer a distance of the one or more perceived objects in relation to the autonomous machine, as part of the perception information extracted by the at least one vision perception module.

5. The method according to claim 3, wherein the perception information extracted by the at least one vision perception module further comprises a respective tracking ID for the one or more perceived objects, wherein the tracking ID is a newly assigned tracking ID or an old tracking ID based on a comparison of a current image frame with a previous image frame, wherein the method comprises tracking a position of the one or more perceived objects over time based on the respective tracking IDs.

6. The method according to claim 1, wherein the plurality of sensors comprises at least one laser scanner and the plurality of perception modules comprises at least one laser scan perception module, wherein the method comprises processing laser sensor data streamed via the at least one laser scanner by the at least one laser scan perception module to perceive a presence of an object within a defined range from the autonomous machine and infer a distance of the perceived object in relation to the autonomous machine, as part of the perception information extracted by the at least one laser scan perception module.

7. The method according to claim 1, wherein the plurality of sensors comprises at least one adaptive directional microphone and the plurality of perception modules comprises at least one audio perception module configured to process audio data streamed by the at least one adaptive directional microphone, wherein the method comprises processing the streamed audio data by the at least one audio perception module to detect and directionally locate audio signals transmitted by one or more objects in the operating environment of the autonomous machine, which define presence and location information of one or more perceived objects in the operating environment of the autonomous machine, as part of the perception information extracted by the at least one audio perception module.

8. The method according to claim 1, wherein the blackboard image created by the context awareness module comprises a graphical representation of the operating environment of the autonomous machine including one or more perceived objects and their inferred location in relation to the autonomous machine using the controlled semantic.

9. The method according to claim 8, wherein the controlled semantic comprises graphically representing the autonomous machine and different classes of perceived objects using defined colors, or shapes, or icons, or combinations thereof.

10. The method according to claim 8, wherein the controlled semantic comprises graphically representing a dynamic property of the autonomous machine and/or of the one or more perceived objects.

11. The method according to claim 8, wherein blackboard image comprises a graphical representation of an uncertainty with respect to the inferred location of the one or more perceived objects.

12. The method according to claim 8, wherein the blackboard image comprises a graphical representation of safe or unsafe zones for different objects in relation to the autonomous machine, wherein the safe or unsafe zones are determined based on a dynamic property of the autonomous machine.

13. The method according to claim 1, wherein implementation of the control policy is triggered upon detection of a perception event, wherein the perception event is detected by processing the stream of blackboard images to determine a defined change in the context of the autonomous machine represented by a current blackboard image in relation to a previous blackboard image in the stream of blackboard images.

14. The method according to claim 1, wherein the control policy comprises a deep neural network.

15. The method according to claim 14, wherein the deep neural network includes a recurrent neural network (RNN) configured to process the stream of blackboard images as time series input data to determine the control action.

16. The method according to claim 1, wherein the control policy is trained by:

acquiring real streaming sensor data or simulated streaming sensor data pertaining to multiple sensors in a respectively real or simulated operating environment of the autonomous vehicle, creating a plurality of training blackboard images by extracting perception information from the real streaming sensor data or the simulated streaming sensor data and fusing the extracted perception information using the controlled semantic, wherein the plurality of training blackboard images define different contexts of the autonomous machine, and using the plurality of training blackboard images to learn a mapping of context to control action via a machine learning process.

17. A non-transitory computer-readable storage medium including instructions that, when processed by a computer, configure the computer to perform the method according to claim 1.

* * * * *